United States Patent [19]

Fushiya et al.

[11] Patent Number: 4,562,872
[45] Date of Patent: Jan. 7, 1986

[54] LOCKING SYSTEM IN A PORTABLE ELECTRIC ROUTER

[75] Inventors: Fusao Fushiya; Tetsuhisa Kaneko, both of Anjo, Japan

[73] Assignee: Makita Electric Works, Ltd., Aichi, Japan

[21] Appl. No.: 681,140

[22] Filed: Dec. 13, 1984

[51] Int. Cl.[4] .............................................. B25F 5/00
[52] U.S. Cl. ........................ 144/134 D; 144/136 C; 144/136 D; 74/531; 188/67; 408/241 S; 409/182; 409/218
[58] Field of Search .......... 144/134 R, 134 A, 134 D, 144/136 C, 136 D, 371; 409/134, 208, 209, 210, 218, 181, 182; 188/67; 74/531; 408/241 S

[56] References Cited

U.S. PATENT DOCUMENTS

| | | | |
|---|---|---|---|
| 3,424,280 | 1/1969 | Hettich | 188/67 |
| 4,102,370 | 7/1978 | Vess | 144/134 D |
| 4,239,428 | 12/1980 | Berzina | 409/182 |
| 4,316,685 | 2/1982 | George | 144/134 D |
| 4,319,860 | 3/1982 | Beares | 144/134 D |
| 4,445,811 | 5/1984 | Sanders | 144/134 D |

Primary Examiner—W. D. Bray
Assistant Examiner—Jorji M. Griffin
Attorney, Agent, or Firm—Dennison, Meserole, Pollack & Scheiner

[57] ABSTRACT

A portable electric router conventional in its overall structure is disclosed which includes a locking system comprising a locking pin located in the motor housing and adapted to move in a direction perpendicular to and into locking engagement with the guide bar, and a locking lever pivotally disposed adjacent a grip of the motor housing and operative to axially move the locking pin. The locking lever is adapted to pivot toward the grip to thereby press the locking pin against the guide bar.

9 Claims, 11 Drawing Figures

LOCKING SYSTEM IN A PORTABLE ELECTRIC ROUTER

BACKGROUND OF THE INVENTION

1. Field of the Invention

This invention relates generally to a portable electric router and more particularly to a locking system operative to lock a motor housing of such a router which moves vertically relative to a guide.

2. Description of the Prior Art

In general, such portable electric routers include a motor housing and a driving motor encased in the motor housing and having a cutting tool holding chuck rotatably secured thereto. The motor housing has a pair of hand grips secured to opposite sides thereof and is vertically movably supported on a pair of guide bars extending vertically upwardly from a base. When the router is used, a preselected cutting tool is mounted in the chuck and the base is placed on a workpiece surface. The motor housing is then lowered such that the cutting tool projects outwardly from the workpiece engaging surface of the base. The user of the router holds the grips and moves the router as desired to carry out routing and like operations. In previously known designs, it is common to provide means for locking the motor housing at a preselected downwardly extended position in order to maintain a position in which the cutting tool is projected from the workpiece engaging surface of the base for a desired depth of cut. In the conventional router, however, such a locking system has employed a lock screw for example, requiring the user to screw in or back the lock screw whenever the motor housing is locked. This results in a very cumbersome operation. Additionally, the user is liable to leave the router with the cutting tool still projecting from the workpiece engaging surface of the base notwithstanding the operation has been finished and therefore, the cutting tool may injure the user and/or damage the workpiece, or the tool itself may be broken. Further, when it is desired urgently to release the locked condition during operation, the user of the router has sometimes failed to act quickly, thereby incresing danger in operation.

SUMMARY OF THE INVENTION

It is, accordingly, an object of the present invention to provide an improved electric router including a locking lever by means of which the motor housing may be simply and readily locked relative to the router base without removing the hand from the grip.

It is another object of the present invention to provide a portable electric router which is easy to handle and safe to use.

According to the present invention there is provided in a router conventional in its overall structure a locking system which comprises a locking pin located in the motor housing and adapted to move in a direction perpendicular to and into locking engagement with the guide bar; and a locking lever pivotally disposed adjacent a grip of the motor housing and operative to axially move the locking pin. The locking lever is adapted to pivot toward the grip to thereby press the locking pin against the guide bar.

The present invention will become more fully apparent from the claims and description as it proceeds in connection with the drawings.

DETAILED DESCRIPTION OF THE PREFERRED EMBODIMENTS

Figure 1:
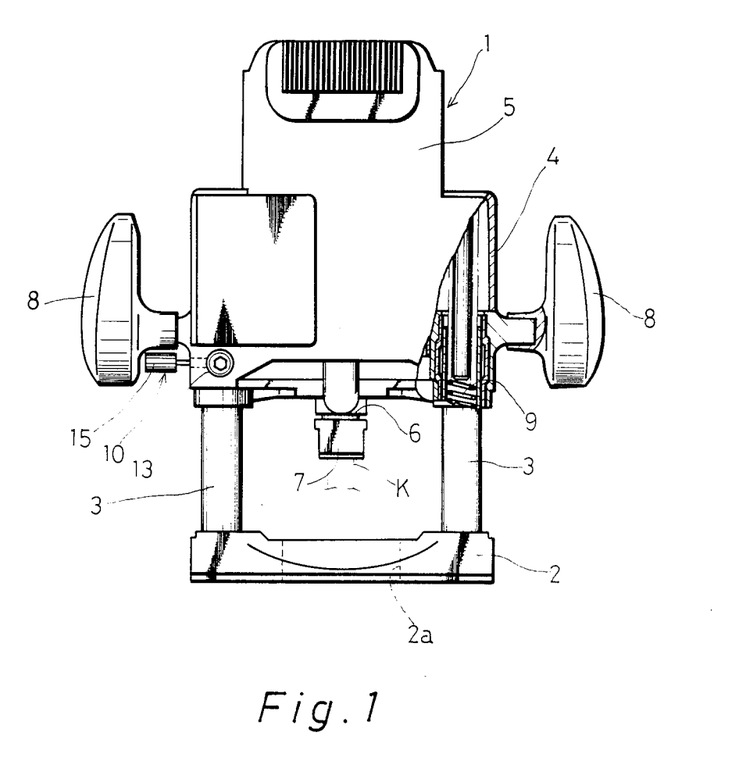
FIG. 1 is a front view, partly in cross section, of a portable electric router incorporating the first embodiment of a locking system in accordance with the present invention.
Figure 2:
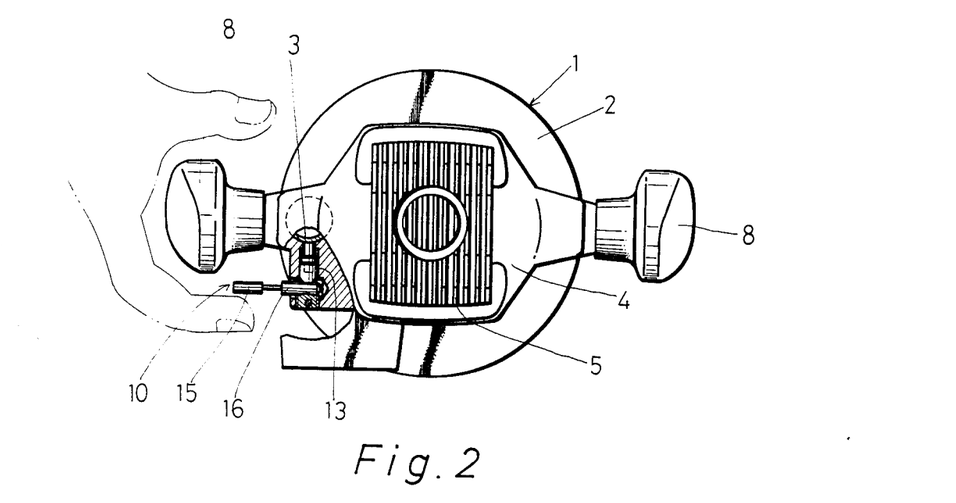
FIG. 2 is a plan view, partly in cross section, of the router of FIG. 1.
Figure 3:
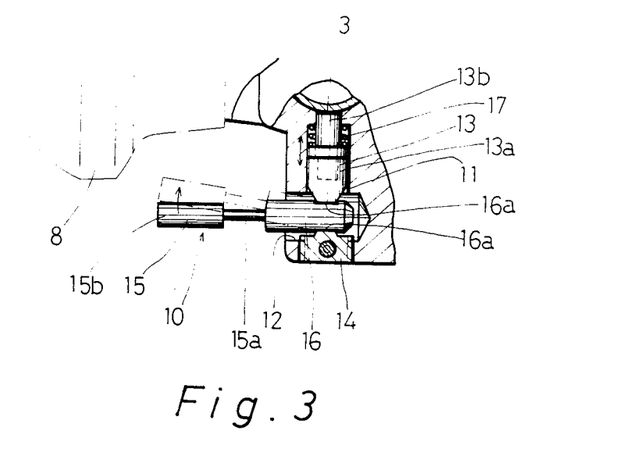
FIG. 3 is a fragmentary cross-sectional view, on an enlarged scale, of the essential parts of the router shown in FIG. 2.

Referring to the drawings and to FIGS. 1 through 3 in particular, shown therein is the first embodiment of this invention. In FIG. 1, reference numeral 1 designates a portable electric router which includes a disk-shaped base 2, a pair of pipe-shaped guide bars 3, and a motor housing 4 operable to move vertically along the guide bars 3. Provided centrally in the base 2 is an aperture 2a through which retractably projects a cutting tool K which will be described below.

While not shown, a suitable driving motor is housed within the motor housing 4 as generally indicated at 5 and includes a spindle 6 connected thereto and projecting slightly downwardly from the lower end of the motor housing 4. The spindle 6 includes a cutting tool holding chuck 7 secured thereto and adapted to hold a router bit or cutting tool K. The motor housing 4 includes a pair of hand grips 8 secured to opposite sides thereof and adapted to be grasped during operation of the router. Each of the guide bars 3 includes a compression spring 9 resiliently received therewithin, the upper end of the spring 9 contacting the upper portion of the motor housing 4. Thus, the motor housing 4 is normally urged in an upward direction relative to the guide bars 3, that is, to an upwardly retracted position.

On one of the guide bars 3 (the left-hand one as viewed in the drawing) is a locking system 10 operable to lock the motor housing 4 against the guide bar 3. Specifically, as shown in FIG. 3, the motor housing 4 is provided with a stepped, first bore 11 extending perpendicular to the guide bar 3 from one edge surface of the motor housing 4 toward the guide bar 3, and a second bore 12 extending perpendicular to the first bore 11 and communicating with the first bore 11 generally at the forward region of the first bore 11. The locking system 10 includes a locking pin 13 movably received within the first bore 11 adjacent the guide bar 3. The locking pin 13 is composed of a pin body 13a having a generally frustoconical end projecting into the second bore 12; and a presser body 13b formed of relatively softer material than the pin body 13a and replaceably mounted to the rearward end of the pin body 13a, the rearward end of the presser body 13b being adapted to abut against the guide bar 3. In the forward region of the first bore 11 is a locking screw 14 which has a frustoconical end projecting into the second bore 12.

The locking system 10 further includes a locking lever 15 with an operating pin 16 loosely inserted in the second bore 12. The operating pin 16 has a pair of opposite flat portions 16a formed on the outer periphery thereof, one of the flat portions 16a being adapted to abut against the forward flat edge of the locking pin 13, and the other flat portion 16a being adapted to abut against the flat edge of the locking screw 14, thereby preventing withdrawal and rotation of the locking lever 15. The locking lever 15 includes a lever piece 15a connected to the end of the operating pin 16 projecting from the motor housing 4. Connected to the lever piece 15a is a finger grip 15b which extends generally adjacent the grip 8. With this arrangement, the locking lever 15 may be pivoted toward the grip 8, since the operating pin 16 may be pivoted about the tips of the locking pin 13 and the locking screw 14 which abut against the flat portions 16a of the operating pin 16, respectively. The locking pin 13 is normally biased in a direction in which the presser body 13b moves away from the guide bar 3 by a compression spring 17 disposed within the stepped portion of the first bore 11. Thus, the locking lever 15 is normally urged in a direction away from the grip 8 and into a predetermined position.

In operation, the user holds the hand grips 8 of the motor housing 4 and lowers the motor housing 4 along the guide bars 3 to project the tool K from the workpiece engaging surface of the base 2. The user then moves the router 1 to carry out routing and like operations. Specifically, in order to set a downwardly extended position of the motor housing 4, that is, in order to maintain a position in which the tool K is projected from the workpiece engaging surface of the base 2 for a desired depth of cut, the user operates the finger grip 15b of the locking lever 15 by his finger without removing the hand from the hand grip 8. Thus, as the user holds the grip 8 while pulling the locking lever 15 with his finger, the operating lever 16 pivots toward the grip 8 (i.e. in a direction of the arrow shown in FIG. 3) about the frustoconical tips of the locking pin 13 and the locking pin 14 which abut against the flat portions 16a of the operating pin 16, respectively. Upon pivotal movement of the operating lever 16, the locking pin 13 is pushed toward the guide bar 3 against the biasing action of the spring 17, the end of the presser body 13b being pressed against the outer periphery of the guide bar 3. Thus, the motor housing 4 is locked in position relative to the guide bars 3, and this locked position is maintained while the locking lever 15 is gripped together with the hand grip 8.

As should be apparent, to release the locked position of the motor housing 4 relative to the guide bar 3, the user disengages his finger from the finger grip 15b of the locking lever 15, thereby releasing the pressure applied to the locking pin 13. As this occurs, the locking pin 13 is returned to its original position under the biasing action of the spring 17, so that the pressure of the presser body 13b acting on the guide bar 3 is released and the motor housing 4 is allowed for vertical movement relative to the base 2. Thereafter, the operating pin 16 and hence the locking lever 15 are returned to their original position. It will be noted that the motor housing 4 is automatically lifted under the biasing action of the spring 17 to be retained in its upwardly retracted position.

From the foregoing description, it can be appreciated that the locking and unlocking of the motor housing 4 may be extremely simply accomplished, since the locking lever 15 may be manipulated by the user's finger without removing the hand from the grip 8, and the motor housing 4 may be locked in position by rotating the locking lever 15 in a direction to hold the grip 8.

It will be noted in this embodiment that the edge surface of the presser body 13b of the locking pin 13 may be of circular concave surface or of V-shaped concave surface to conform to the outer periphery of the guide bar 3.

Attention is now directed to FIGS. 4 through 11 which illustrate different embodiments of the locking system 10. All parts are numbered to correspond to similar parts of FIGS. 1 through 3, and the general description of the parts of FIGS. 1 through 3 are applicable to the corresponding parts of FIGS. 4 through 11.

Figure 4:
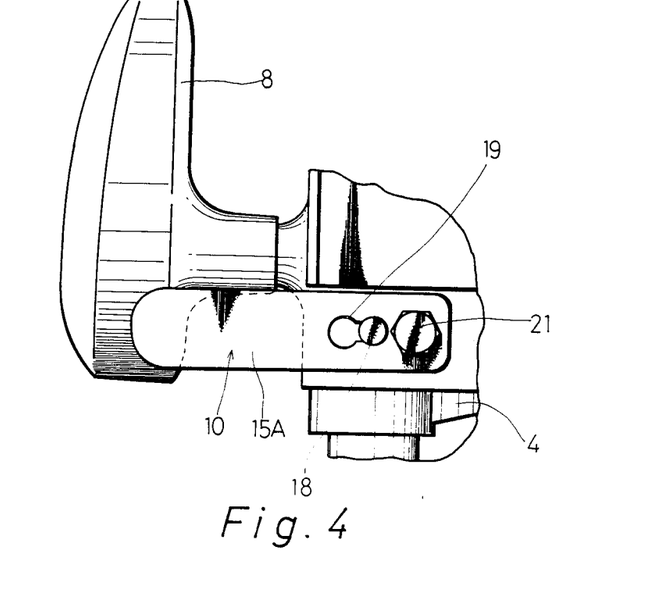
FIG. 4 is a fragmentary front view showing the essential parts of the locking system according to the second embodiment.
Figure 5:
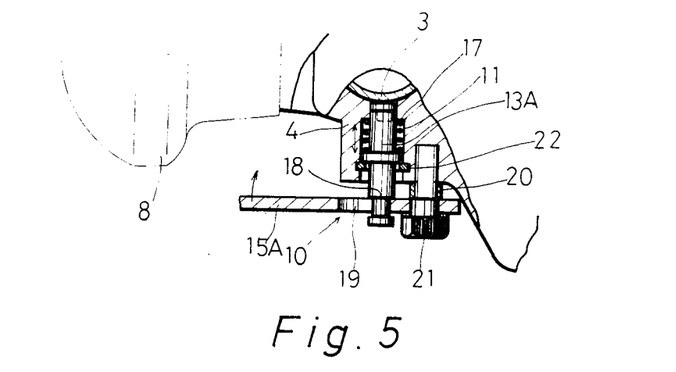
FIG. 5 is a fragmentary cross-sectional view of the locking system of FIG. 4.

FIGS. 4 and 5 show the second embodiment of the present invention. The difference in the second embodiment is that the second bore 12 of the first embodiment is not provided, and that a locking lever 15A is provided corresponding to the locking lever 15 but having a fulcrum located on the outer periphery of the motor housing 4. Specifically, a locking pin 13A is provided in the first bore 11 being movably received by the compression spring 17. The locking pin 13A has one end projecting from the end of the motor housing 4 and formed with a stepped pin portion 18 which is operatively connected to a locking lever 15 A. The locking lever 15A is disposed parallel to the grip 8 and has adjacent one end thereof a profiled aperture 19 in which the pin portion of the locking pin 13A is loosely received. The locking pin 13A is secured to the motor housing 4 through a spacer 20 and a bolt 21. In other respects, the arrangement of this embodiment is the same as that of the first embodiment. In operation, as the user holds the locking lever 15A together with grip 8, the locking lever 15A is pivoted about the bolt 21 and in a direction of the arrow (FIG. 5), that is, toward the grip 8, thereby urging the locking pin 13A through the aperture 19. As this occurs, the locking pin 13A is urged against the biasing action of the spring 17 and brought into locking engagement with the outer periphery of the guide bar 3. Thus, the motor housing 4 is locked against the guide bar 3. In order to release the locked condition of the motor housing 4, the user release the locking lever 15A to return the compression spring 17 to its original position. It will be noted that a stopper ring 22 is provided in the first bore 11 for preventing withdrawal of the locking pin 13A.

Figure 6:
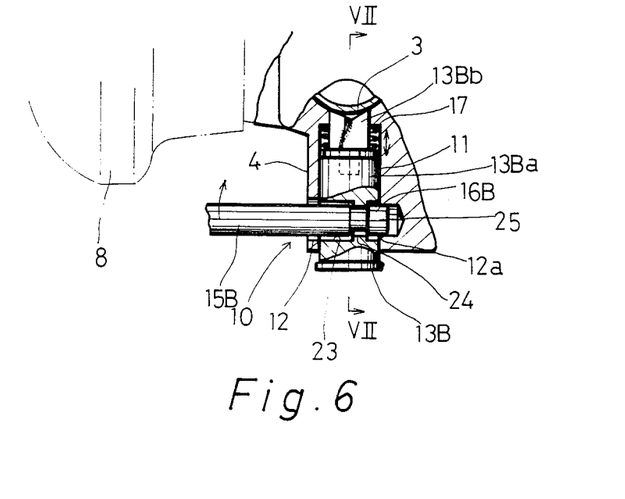
FIG. 6 is a fragmentary cross-sectional view showing the essential parts of the locking system according to the third embodiment.
Figure 7:
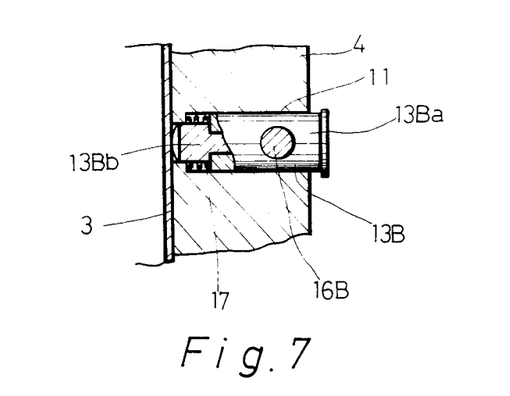
FIG. 7 is a sectional view taken along the line VII—VII of FIG. 6.

FIGS. 6 and 7 show the third embodiment of the present invention. The difference in the third embodiment is that the operating pin 16 and the locking pin 13 are modified. Specifically, a locking pin 13B is provided in the first bore 11 having a pin body 13Ba which in turn has formed therein a bore 23 conforming to the second bore 12 and an annular engaging ridge 24 formed generally on one end of the bore 23. An operating pin 16B is provided being loosely received within the bore 23. The operating pin 16B has an end 25 loosely received in an region 12a extending from the first bore 11 and within the second bore 12. The operating pin 16B also has on the other end thereof a small-diameter portion loosely received in the engaging ridge 24 to prevent withdrawal thereof. As with the first embodiment, a locking lever 15B is secured to the small-diameter end of the operating lever 16B. Further, the locking pin 13B includes a presser body 13Bb having one end of generally V-shaped configuration. In other respects, the arrangement of the third embodiment is the same as that of the first embodiment. Thus, in this embodiment, the pivotal movement of the locking lever 15B is effected about the region 12a of the second bore 12 located at the end 25 of the operating lever 16B. Upon pivotal movement of the operating pin 16B, the locking pin 13B is urged toward the guide bar 3 against the biasing action of the spring 17, the V-shaped edge surface of the presser body 13Bb being pressed against the outer periphery of the guide bar 3. In other respects, the operation and the effects of the third embodiment are the same as those of the first embodiment.

Figure 8:
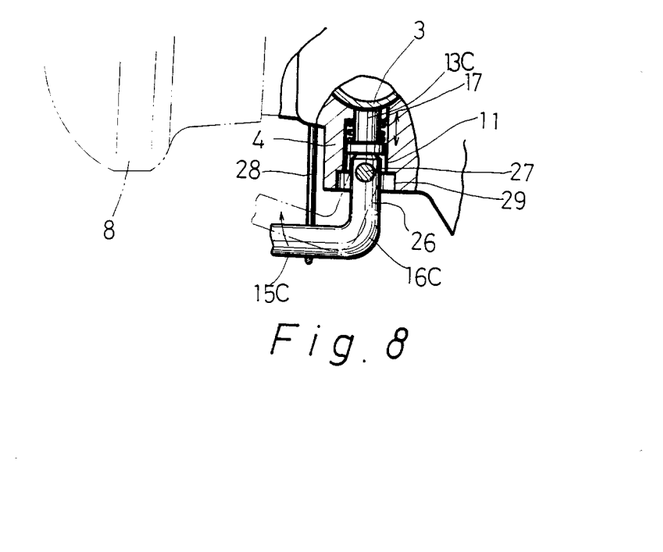
FIG. 8 is a fragmentary cross-sectional view showing the essential parts of the locking system according to the fourth embodiment.

FIG. 8 shows the fourth embodiment of the present invention. In this embodiment, the locking pin 13 and the locking lever 15 of the first embodiment are simplified in construction. A locking pin 13C is provided corresponding to the locking pin 13 described above but having a flange secured thereto and being received in the first bore 11 through the compression spring 17. A locking lever 15C is provided having an integral operating pin 16C bent into generally L-shaped configuration. The operating pin 16C has a shank 26 loosely received within the first bore 11 and adapted to abut against the flange of the locking pin 13C. The operating pin 16C is supported on a support pin 27 for pivotal movement toward the grip 8. Additionally, the motor housing 4 includes a stopper 28 extending therefrom and adapted to limit the pivotal movement of the operating pin 16C in a direction away from the grip 8. Thus, as the operating pin 16C of the locking lever 15C is pivoted about the support pin 27, the edge surface of the shank 26 is pivoted likewise about the support pin 27, thereby pressing the locking pin 13C against the biasing action of the compression spring 17 so as to bring the locking pin 13C into locking engagement with the guide bar 3. In other respects, the operation and the effects of the fourth embodiment are the same as those of the first embodiment. However, it will be noted in this embodiment that a large-diameter recess 29 is formed in the outer end of the first bore 11 so that the range of pivotal movement of the operating pin 16C may be larger than that of the first embodiment.

Figure 9:
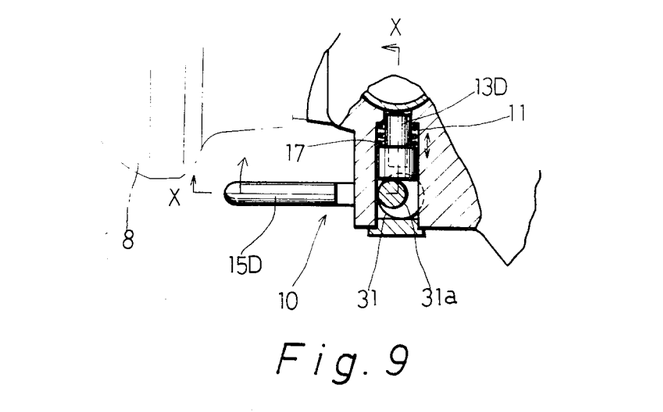
FIG. 9 is a fragmentary cross-sectional view showing the essential parts of the locking system according to the fifth embodiment.
Figure 10:
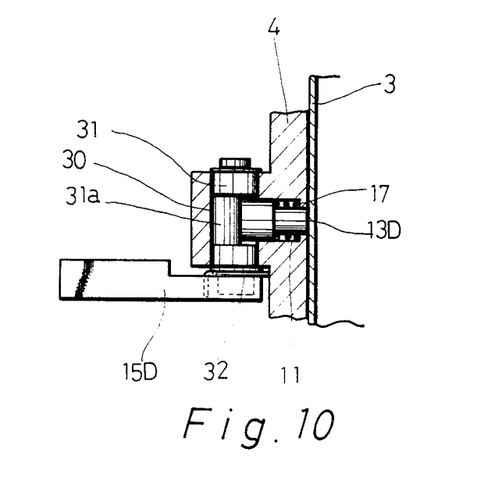
FIG. 10 is a sectional view taken along the line X—X of FIG. 9.
Figure 11:
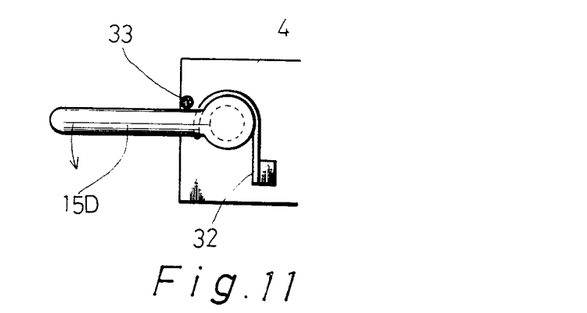
FIG. 11 is a bottom end view of the locking system shown in FIG. 9.

FIGS. 9 through 11 show the fifth embodiment of the present invention, in which the locking pin is pushed by an eccentric pin. Specifically, the motor housing 4 is formed with a second bore 30 vertically extending therewithin at right angles relative to the first bore 11. Rotatably but unremovably received in the second bore 30 through a retaining ring is an eccentric pin 31 which has an eccentric shank 31a on its medial portion opposite to the first bore 11 and a knurled end projecting from the motor housing 4. A locking pin 13D is received within the first bore 11 and between the guide bar 3 and the eccentric shank 31a, and is normally biased by the compression 17 against the eccentric shank 31a. A locking lever 15D is secured to the knurled end of the eccentric pin 30 and extending toward the grip 8. As the locking lever 15D is pivoted toward the grip 8, the eccentric shank 31a of the eccentric pin 30 urges the locking pin 13D against the guide bar 3. A tortion spring 32 is provided between the locking lever 15D and the motor housing 4 and acts to return the locking lever 15 when rotated. Further, a stopper 33 is provided to prevent the locking lever from pivoting farther than is necessary. Thus, as the locking lever 15D is rotated toward the grip 8 by the user's finger, the eccentric pin 31 is rotated with the eccentric shank 31a urging the locking pin 13D against the biasing action of the spring 17, the edge surface being pressed against the guide bar 3. Conversely, when the user's finger is released from the locking lever 15D, the locking lever 15D is returned to its original position, causing the eccentric pin 31 to rotate in the reverse direction to release the pressure of the locking pin 13D acting on the guide bar 3. In other respects, the operation and the effects of the fifth embodiment are the same as those of the first embodiment.

While the invention has been described with reference to preferred embodiments thereof, it is to be understood that modifications or variations may be easily made without departing from the spirit of this invention which is defined by the appended claims.

What is claimed is:

1. In a portable electric router including a motor housing having a pair of hand grips secured to opposite sides thereof, a driving motor encased in said motor housing and having a driving shaft extending downwardly from the lower end of said motor housing, said driving shaft having a cutting tool holding chuck secured thereto, and a base having guide means extending upwardly therefrom, said motor housing being vertically movable with respect to said guide means, means for locking said motor housing in a preselected downwardly extended position comprising a locking pin disposed within said motor housing and adapted to move in a direction perpendicular to and into locking engagement with said guide means, and a locking lever pivotally disposed adjacent one of said hand grips and operative to axially move said locking pin, said locking lever being adapted to press said locking pin against said guide means when said locking lever is pivoted toward said grip.

2. A portable electric router as defined in claim 1 wherein said motor housing further includes a first bore having a stepped portion and extending substantially perpendicular to said guide means, said first bore being adapted to movably receive said locking pin therein, and a spring positioned between said locking pin and said stepped portion of said first bore, said spring being operative to normally bias said locking pin into engagement with said locking lever.

3. A portable electric router as defined in claim 2 wherein said motor housing includes a second bore extending substantially perpendicular to said locking pin and adapted to loosely receive one end portion of said locking lever therein, said locking lever being arranged to abut against said locking pin generally on one side of said one end portion so as to establish a fulcrum of pivotal movement thereof within said motor housing.

4. A portable electric router as defined in claim 1 wherein said locking pin comprises a pin body, and a presser body formed of a relatively softer material than said pin body, said presser body being secured to said pin body and adapted to abut against said guide means.

5. A portable electric router as defined in claim 1 wherein said locking pin has an edge surface to be pressed against said guide means, said edge surface being of a generally V-shaped configuration.

6. A portable electric router as defined in claim 1 wherein said locking lever extends substantially perpendicular to said locking pin and has adjacent one end thereof a flat portion abutting against the end of said locking pin, said locking lever being operative to axially move said locking pin.

7. A portable electric router as defined in claim 1 wherein said locking lever is pivotally connected at one end to the outer periphery of said motor housing so as to establish a fulcrum of pivotal movement thereof on the outer periphery of said motor housing.

8. A portable electric router as defined in claim 1 wherein said locking lever is of generally L-shaped configuration and pivotally supported at one end on said motor housing through a support pin, said locking lever being operative to axially move said locking pin.

9. A portable electric router as defined in claim 1 wherein said motor housing includes an eccentric pin interposed between said locking lever and said locking pin and adapted for rotation by said locking lever, said eccentric pin having an eccentric shank operative to axially move said locking pin into engagement with said guide means.

* * * * *